United States Patent [19]

Hirakawa

[11] Patent Number: 5,233,474
[45] Date of Patent: Aug. 3, 1993

[54] WIDE-ANGLE LENS SYSTEM

[75] Inventor: Jun Hirakawa, Tokyo, Japan

[73] Assignee: Asahi Kogaku Kogyo K.K., Tokyo, Japan

[21] Appl. No.: 830,377

[22] Filed: Jan. 31, 1992

[30] Foreign Application Priority Data

Feb. 15, 1991 [JP] Japan .................. 3-106953

[51] Int. Cl.⁵ .................. G02B 3/02; G02B 13/04; G02B 9/04
[52] U.S. Cl. .................. 359/717; 359/793; 359/753
[58] Field of Search .............. 359/717, 793, 753, 714, 359/766

[56] References Cited

U.S. PATENT DOCUMENTS

| | | | |
|---|---|---|---|
| 2,594,020 | 4/1952 | Hopkins et al. | 359/766 |
| 3,023,672 | 3/1962 | Sandback | 359/753 |
| 4,203,653 | 5/1980 | Mori | 359/753 |
| 4,830,473 | 5/1989 | Kudo | 359/717 |

FOREIGN PATENT DOCUMENTS

| | | | |
|---|---|---|---|
| 2114729 | 9/1972 | Fed. Rep. of Germany | 359/793 |
| 2727636 | 12/1977 | Fed. Rep. of Germany | 359/793 |
| 54-12728 | 1/1979 | Japan . | |
| 0202414 | 11/1983 | Japan | 359/714 |
| 0178419 | 9/1985 | Japan | 359/717 |
| 62-78520 | 4/1987 | Japan . | |
| 0198006 | 8/1991 | Japan | 359/714 |
| 1088192 | 10/1967 | United Kingdom | 359/717 |

*Primary Examiner*—Bruce Y. Arnold
*Assistant Examiner*—Evelyn A. Lester
*Attorney, Agent, or Firm*—Sughrue, Mion, Zinn, Macpeak & Seas

[57] ABSTRACT

A retro-focus wide-angle lens system having, in order from the object side, a negative power front group and a positive power rear group having a diaphragm stop. The front group comprises a positive first lens element and a negative meniscus second lens element having a convex surface directed towards the object. The rear group comprises a positive third lens element, a negative fourth lens element having an aspheric surface and a positive fifth lens element. The negative power of the fourth lens element increases toward the outer edge.

18 Claims, 6 Drawing Sheets

WIDE-ANGLE LENS SYSTEM

BACKGROUND OF THE INVENTION

This application is based on and claims priority from Japanese Patent Application No. Hei. 3-106953 filed Feb. 15, 1991, the disclosure of which is incorporated by reference herein.

The present invention relates to a retro-focus type wide-angle lens system suitable for use with cameras, such as single-lens reflex cameras. More particularly, the present invention relates to a wide-angle lens system having an aspheric surface.

In order to ensure adequate back focus, single lens reflex cameras use retro-focus type wide-angle lens systems having a negative power front lens group and a positive power rear lens group. (The terms "group" and "component" are used interchangeably herein to refer to at least one lens element.) For example, Unexamined Published Japanese Patent Application No. 12728/1979 discloses a compact Wide-angle lens system with a simple five-element composition having an overall focal length F=2.8 and a half-view angle of 37°. In another example, Unexamined Published Japanese Patent Application No. 78520/1987 discloses a retro-focus-type wide-angle lens system having a five-element composition, the front lens group of which includes an aspheric surface.

However, the prior art wide-angle lens systems have several problems. The system described in Unexamined Published Japanese Patent Application No. 12728/1979 experiences large off-axis coma and lateral chromatic aberrations, as a result of its simple five-element composition. The system described in Unexamined Published Japanese Patent Application No. 78520/1987 positions an aspheric surface in the front lens group and away from the diaphragm stop to correct for off-axis aberrations, field curvature and distortion. However, this system cannot effectively correct for astigmatism and lateral chromatic aberrations.

SUMMARY OF THE INVENTION

It is an object of the present invention to overcome the problems discussed above and to provide a five-element lens structure for a retro-focus type high-performance wide-angle lens system by using an appropriately shaped aspheric surface.

It is also an object to provide a wide-angle lens system comprising, in order from the object side, a front group having a negative power and a rear group having a diaphragm stop and a positive power. The front group includes a positive first lens element and a negative meniscus second lens element having a convex surface directed towards the object. The rear group comprises a positive third lens element and a negative fourth lens element having an aspheric surface, wherein the fourth lens element's negative power increases towards the edge. The rear group also includes a positive fifth lens element. The lens system satisfies the following conditions:

$3.5 < [\log(\Delta X1/\Delta X2)/\log 2] < 4.5$ $1.0 < |fF/f| < 1.4, fF < 0$ $NRP > 1.65$ where $\Delta X1$ is the offset of the aspheric surface at the edge of the effective aperture from the paraxial spherical surface along the optical axis; $\Delta X2$ is the offset of the aspheric surface at one half of the effective aperture from the paraxial spherical surface along the optical axis; fF is the focal length of the front group; f is the focal length of the overall lens systems; and NRP is the refractive index at the d-line of a positive lens element in the rear group.

BRIEF DESCRIPTION OF THE DRAWINGS

The invention will be more clearly understood from the following description in conjunction with the accompanying drawings, in which.

DETAILED DESCRIPTION OF THE PREFERRED EMBODIMENTS

Figure 1:
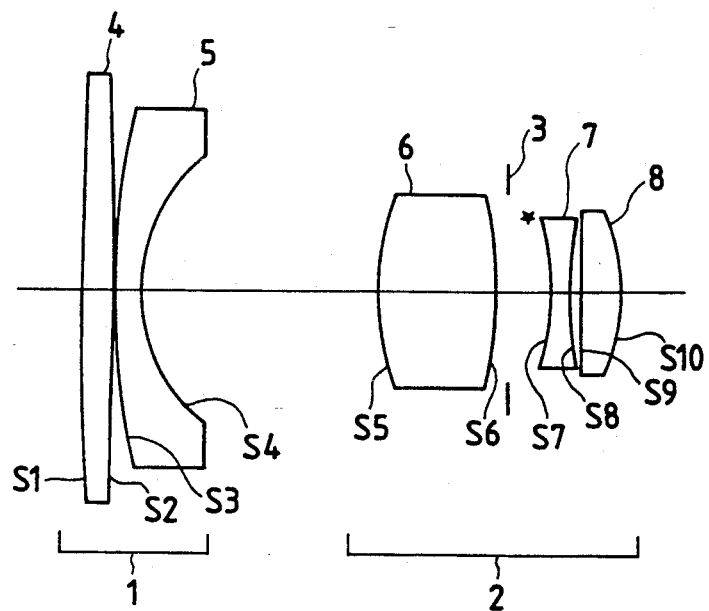
FIG. 1 is a simplified cross-sectional view of the wide-angle lens system of Example 1.

FIG. 1 illustrates a wide-angle lens system including a front lens group 1 having a negative power and a rear lens group 2 having a positive power. The rear lens group includes a diaphragm stop 3. The front group comprises a positive first lens element 4 and a negative meniscus second lens element 5 having a convex surface directed towards the object. The rear group 2 comprises a positive third lens element 6, a negative fourth lens element 7 having an aspheric surface, and a positive fifth lens element 8. The negative power of the fourth lens element 7 increases towards the outer edge of the lens.

The rear group 2 possesses a strong positive power to focus the light rays that have become divergent while passing through the front group 1. However, using a rear group with strong positive power increases the likelihood that spherical aberrations will not be adequately corrected. To avoid this problem, element 7 (closest to the diaphragm stop 3) in the rear group is constructed with an aspheric lens surface S7. Thus, spherical aberrations can be effectively corrected without substantially effecting the off-axis light rays.

This aspheric surface S7 on the fourth lens element may be directly worked from an optical glass material or indirectly shaped by providing a thin synthetic resin layer on a spherical lens surface. Examples 1 and 2 to be described hereinafter refer to the case where an aspheric surface is directly worked from an optical glass material. Examples 3, 4 and 5 refer to the case where an aspheric surface is shaped by providing a thin synthetic resin layer (surface S7 in the Tables) over a spherical surface (surface S8 in the tables).

In the preferred embodiment of the present invention, the wide-angle lens system must satisfy the following 3 conditions:

$$3.5 < [\log(\Delta X1/\Delta X2)/\log 2] < 4.5 \quad (1)$$

$$1.0 < |fF/f| < 1.4, \; fF < 0 \quad (2)$$

$$NRP > 1.65 \quad (3)$$

where $\Delta X1$ is the offset of the aspheric surface at the edge of the effective aperture from the paraxial spherical surface along the optical axis; $\Delta X2$ is the offset of the aspheric surface at one half of the effective aperture from the paraxial spherical surface along the optical axis; fF is the focal length of the front group; f is the focal length of the overall lens systems; and NRP is the refractive index at the d-line of a positive lens element in the rear group.

A spherical aberration is a wave front aberration having a geometric shape (i.e. the position at which a light ray intersects the optical axis relative to the focal point) proportional to the fourth power of the height (h) at which an incident ray contacts the aspheric surface. Consequently, a spherical aberration can be corrected by using an aspheric surface S7 (FIG. 1) having a shape that is proportional to the fourth power of the height h. Thus, a positive wave front aberration of a fourth-order shape may be created by providing an aspheric surface of the fourth-order near the diaphragm stop, wherein the negative power of lens element having the aspheric surface increases towards the outer edge.

Condition (1) set forth above specifies the shape of the aspheric surface S7 of the fourth lens element 7 in such a way that it is generally proportional to the fourth power of the height of incidence (h). If the fourth lens element has an aspheric surface, the shape of which exceeds the upper limit of the equation in condition (1), the overall system will overcorrect for marginal on-axis light rays. If the shape of the aspheric surface on the fourth lens element falls below the lower limit of condition (1), the overall system will under correct for spherical aberrations.

Condition (2) must be satisfied to ensure adequate back-focus and compact size for the lens system. If the negative power of the front group is made stronger than the lower limit of condition (2), inward coma will develop at the second surface S2 of the second lens element 5. Additionally, using a negative power above unit in the front group will cause light rays to diverge in an increased amount. This increased divergence will require a stronger positive power in the rear group. However, increasing the positive power in the rear group increases the likelihood of under-correction for spherical aberrations.

Alternatively, if the negative power of the front group is made weaker than the upper limit of condition (2), the overall size of the lens system increases and it becomes more difficult to assure a wide view angle.

Condition (3) specifies the refractive index of a positive lens element in the rear group. The positive lens elements in the rear group govern the overall power of the system and have a strong positive power. Hence, by using an optical glass material of high refractive index in these lens elements, the Petzval sum and, hence, the field curvature can be reduced. If the refractive index of the positive lens elements is too low to satisfy condition (3), the Petzval sum becomes large, thereby increasing the likelihood that field curvature will occur on the object side. Additionally, a low refractive index requires a stronger curvature in the rear group to ensure that the power of the rear group is sufficient. However, as noted above, increasing the power of the rear group increases spherical aberrations and coma effects.

In another embodiment, the wide-angle lens system is constructed to satisfy the following conditions (4) and (5):

$$\nu 1 > 60 \quad (4)$$

$$N > 1.55 \quad (5)$$

where $\nu 1$ is the Abbe number of the first lens element and N1 is the refractive index of the first lens element at the d-line.

Conditions (4) and (5) specify the Abbe number and refractive index of the first lens elements. Satisfying condition (4) contributes to even more effective correction for lateral chromatic aberration, and satisfying condition (5) contributes to even more effective correction for distortion.

Five examples of the present invention are described below, in which the shape of the aspheric surface S7 (also designated by an asterisk) shall be represented by the following equation:

$$X = \frac{Ch^2}{1 + \sqrt{1 - (1+K)C^2h^2}} + A4h^4 + A6h^6 + A8h^8 + A10h^{10} \quad (1)$$

where X is the coordinate in the direction of the optical axis; h is the coordinate in the direction perpendicular to the optical axis; C is the curvature (1/r); K is a conic constant; and An is an aspheric coefficient (n=4, 6, 8, 10).

Figure 11:
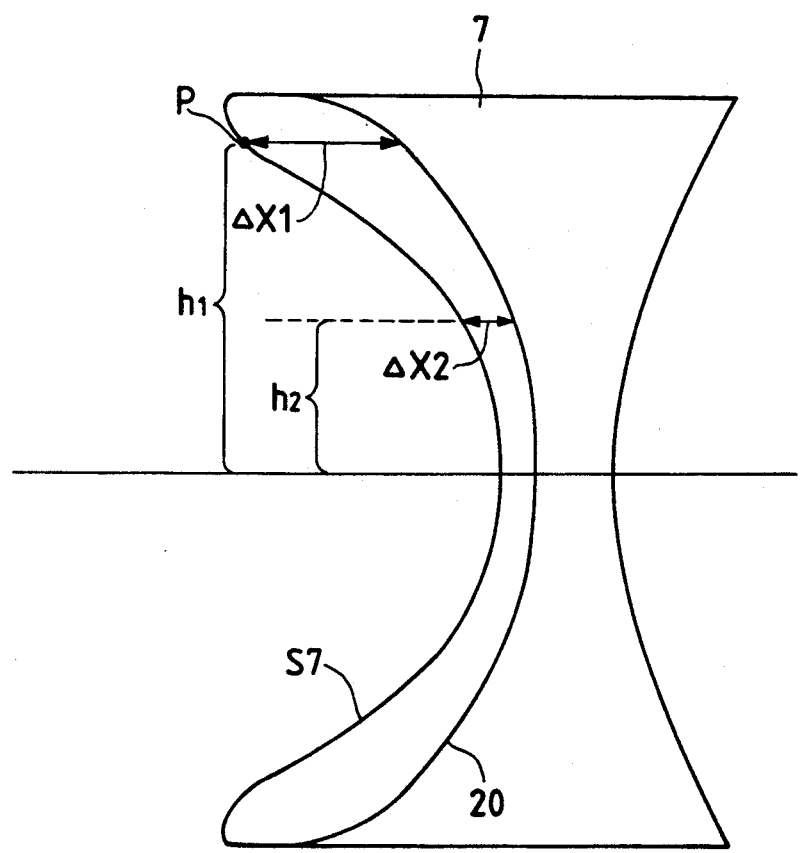
FIG. 11 illustrates the fourth lens element of FIG. 1 in detail

FIG. 11 illustrates the fourth element 7 (FIG. 1) in greater detail. The paraxial spherical surface is designated at 20 and corresponds to a spherical reference plane within the fourth element. Spherical plane 20 intersects the optical axis at X=0, such that the distance X between spherical plane 20 and the aspheric surface S7 is designated by condition (1) set forth above. The distance between plane 20 and surface S7 at any given point P along the surface S7 is a function of the height h of the point P.

EXAMPLE 1

Figure 2:
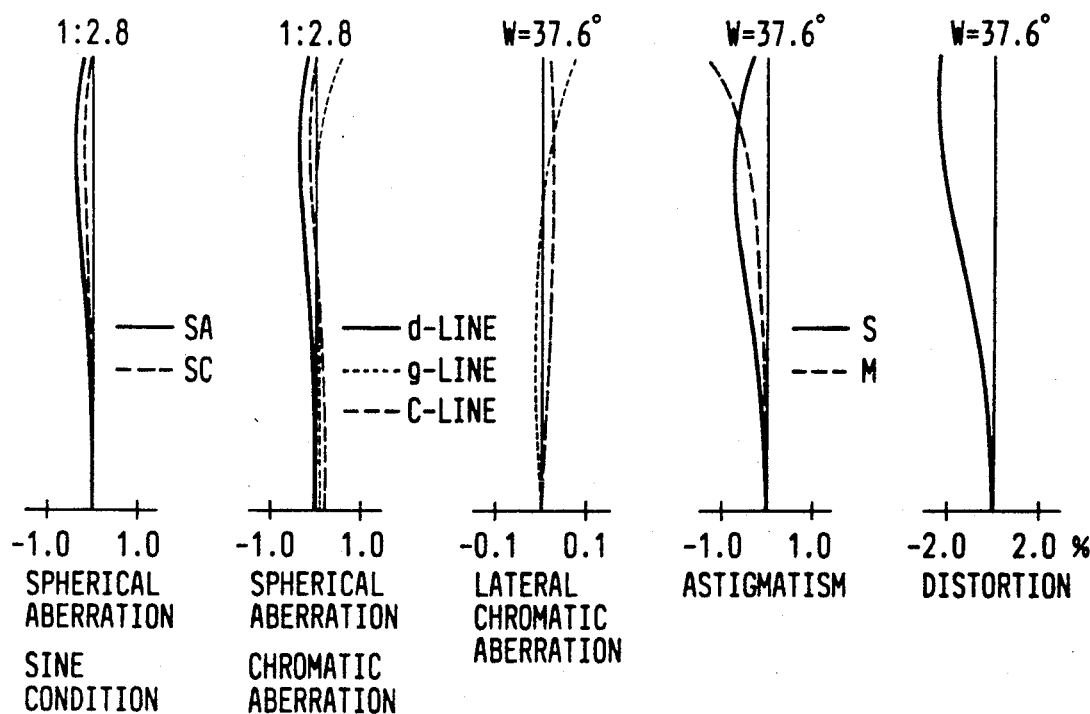
FIG. 2 shows the aberration curves for the lens system of FIG. 1.

FIG. 1 is a simplified cross-sectional view of a wide-angle lens system according to Example 1 of the present invention. Specific numerical data for this lens system are set forth in Table 1, and the aberration curves for the system are shown in FIG. 2. Within Table 1, r denotes the radius of curvature, d represents the thickness of an individual lens or the air space between lens surfaces, N is the refractive index, $\nu$ is the Abbe number, f is the focal length, fB is the back focus, FNo. is the aperture ratio, $\omega$ is the half view angle and An represents the aspheric coefficients (n=4, 6, 8 and 10).

TABLE 1

| | f = 100 | fB = 127.2 | | |
| | FNo. = 1:2.8 | $\omega$ = 37.6° | | |
| Surface No. | r | d | N | $\nu$ |
| --- | --- | --- | --- | --- |
| S1 | 1351.00 | 10.43 | 1.58913 | 61.2 |

TABLE 1-continued

| Surface No. | f = 100<br>FNo. = 1:2.8<br>r | fB = 127.2<br>ω = 37.6°<br>d | N | v |
|---|---|---|---|---|
| S2 | −1509.94 | 0.35 | | |
| S3 | 225.40 | 8.34 | 1.62041 | 60.3 |
| S4 | 49.74 | 69.55 | | |
| S5 | 84.27 | 38.23 | 1.77250 | 49.6 |
| S6 | −169.98 | 18.08 | | |
| *S7 | −84.60 | 6.95 | 1.78470 | 26.2 |
| S8 | 124.89 | 2.29 | | |
| S9 | 686.55 | 11.14 | 1.77250 | 49.6 |
| S10 | −64.47 | | | |

K = 0.000
A4 = −7.926 × $10^{-7}$
A6 = 0.000
A8 = 0.000
A10 = 0.000
[log(ΔX1/ΔX2)/log2] = 4.0
fF = −115.8

EXAMPLE 2

Figure 3:
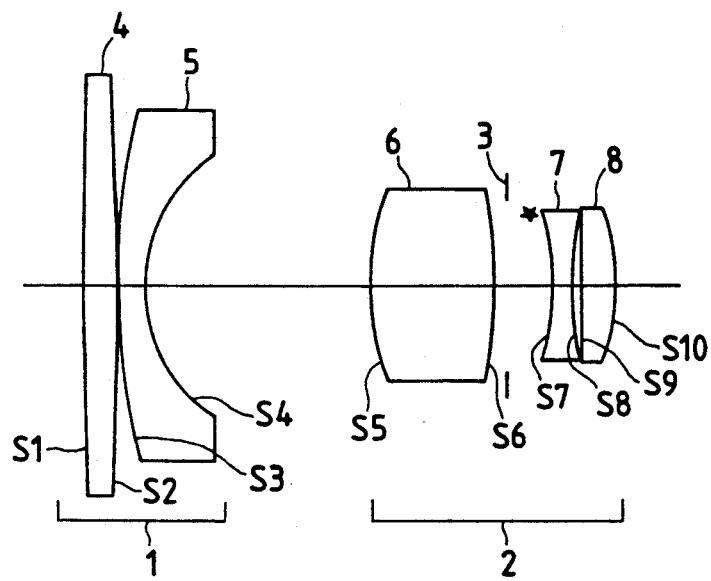
FIG. 3 is a simplified cross-sectional view of the wide-angle lens system of Example 2.
Figure 4:
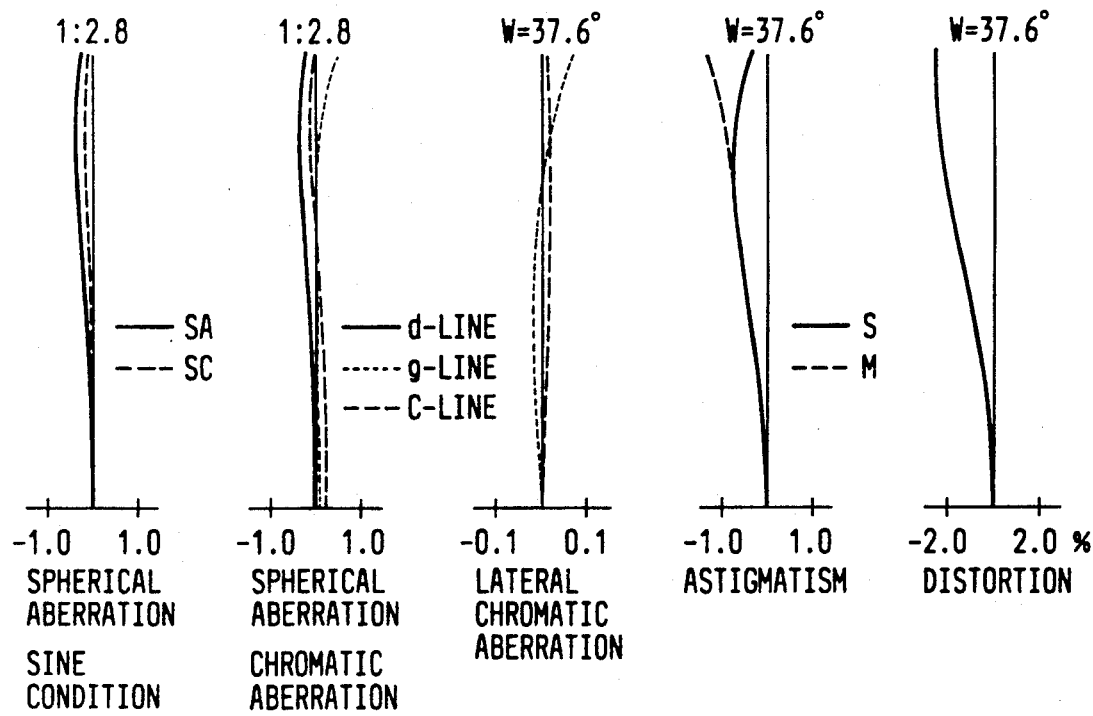
FIG. 4 shows the aberration curves for the lens system of FIG. 3.

FIG. 3 is a simplified cross-sectional view of a wide-angle lens system according to Example 2 of the present INVENTION. Specific numerical data from this lens systems are given in Table 2, and the aberration curves for the system are shown in FIG. 4.

TABLE 2

| Surface No. | f = 100<br>FNo. = 1:2.8<br>r | fB = 128.1<br>ω = 37.6°<br>d | N | v |
|---|---|---|---|---|
| S1 | 1293.91 | 10.43 | 1.69680 | 55.5 |
| S2 | −1752.26 | 0.35 | | |
| S3 | 231.48 | 8.34 | 1.58913 | 61.2 |
| S4 | 49.86 | 75.68 | | |
| S5 | 82.91 | 35.13 | 1.74230 | 49.3 |
| S6 | −157.81 | 17.37 | | |
| *S7 | −85.22 | 6.95 | 1.76180 | 27.1 |
| S8 | 121.14 | 3.17 | | |
| S9 | 658.35 | 12.00 | 1.69680 | 55.5 |
| S10 | −61.86 | | | |

K = 0.000
A4 = −9.030 × $10^{-7}$
A6 = 0.000
A8 = 0.000
A10 = 0.000
[log(ΔX1/ΔX2)/log2] = 4.0
fF = −123.6

EXAMPLE 3

Figure 5:
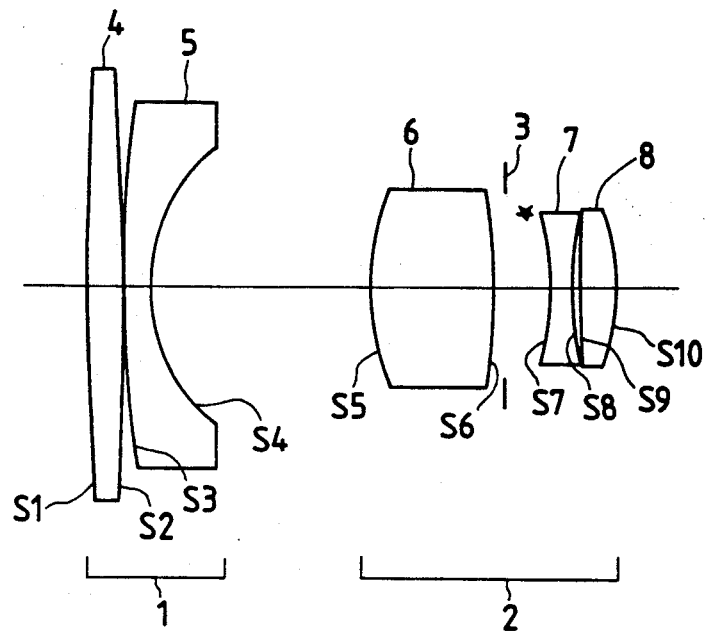
FIG. 5 is a simplified cross-sectional view of the wide-angle lens system of Example 3.
Figure 6:
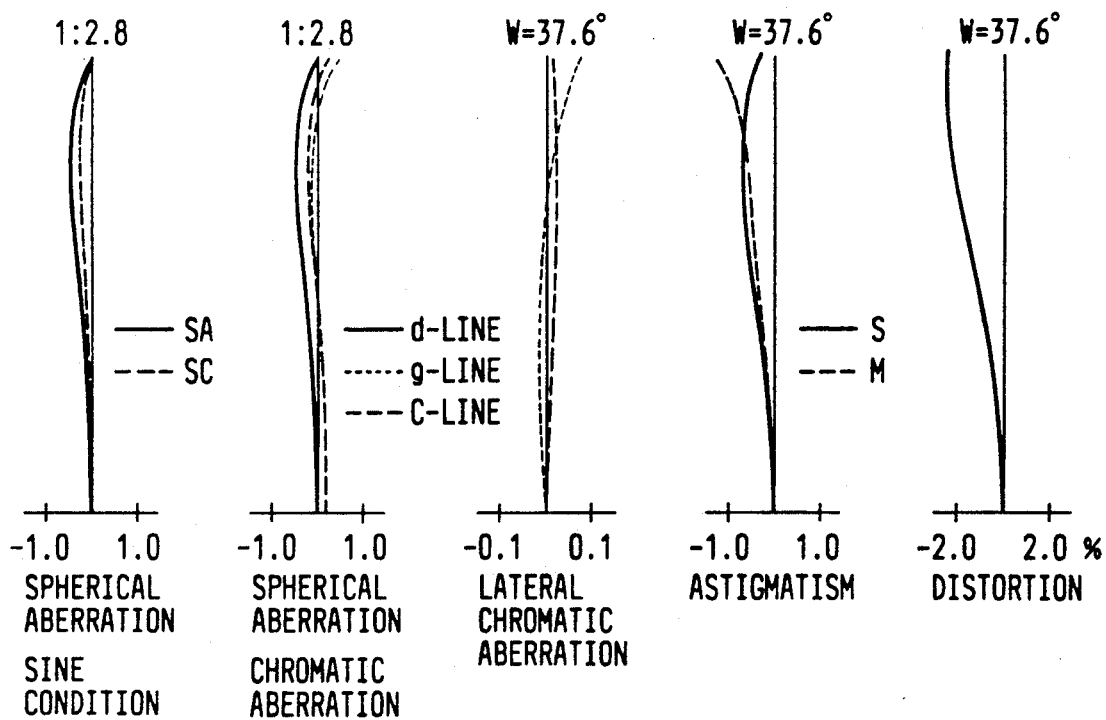
FIG. 6 shows the aberration curves for the lens system of FIG. 5.

FIG. 5 is a simplified cross-sectional view of a wide-angle lens system according to Example 3 of the present invention. Specific numerical data for this lens system are given in Table 3, and the aberration curves for the system are shown in FIG. 6.

TABLE 3

| Surface No. | f = 100<br>FNo. = 1:2.8<br>r | fB = 126.8<br>ω = 37.6°<br>d | N | v |
|---|---|---|---|---|
| S1 | 1208.36 | 10.42 | 1.60311 | 60.7 |
| S2 | −1208.36 | 0.35 | | |
| S3 | 303.35 | 8.69 | 1.62041 | 60.3 |
| S4 | 51.59 | 68.03 | | |
| S5 | 78.76 | 38.61 | 1.77250 | 49.6 |
| S6 | −212.36 | 17.61 | | |
| *S7 | −90.34 | 0.35 | 1.54380 | 39.4 |
| S8 | −90.34 | 6.95 | 1.78472 | 25.7 |
| S9 | 121.43 | 2.19 | | |
| S10 | 663.25 | 11.23 | 1.77250 | 49.6 |
| S11 | −64.56 | | | |

K = 0.000
A4 = −1.2972 × $10^{-6}$

TABLE 3-continued

| Surface No. | f = 100<br>FNo. = 1:2.8<br>r | fB = 126.8<br>ω = 37.6°<br>d | N | v |
|---|---|---|---|---|
| | A6 = 0.000 | | | |
| | A8 = 0.000 | | | |
| | A10 = 0.000 | | | |

[log(ΔX1/ΔX2)/log2] = 4.0
fF = −114.3

EXAMPLE 4

Figure 7:
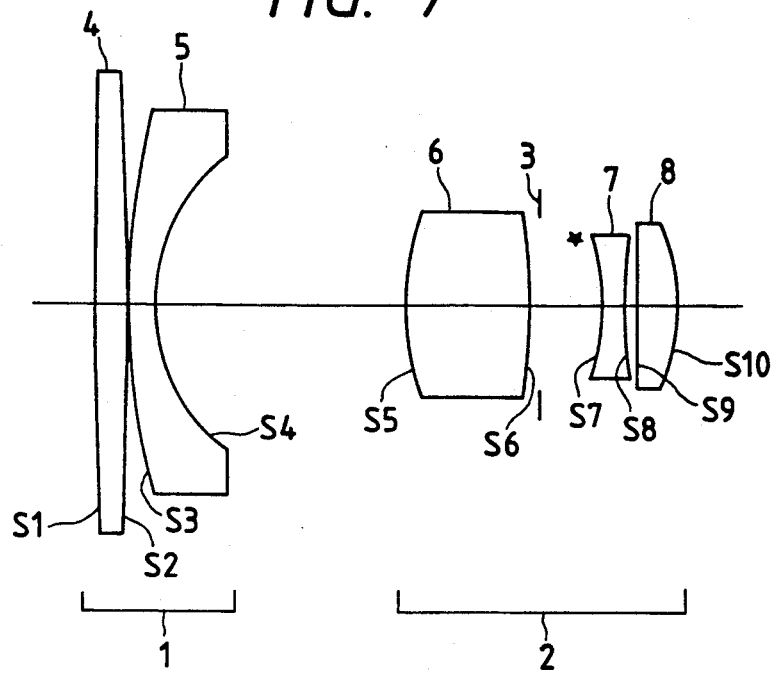
FIG. 7 is a simplified cross-sectional view of the wide-angle lens system of Example 4.
Figure 8:
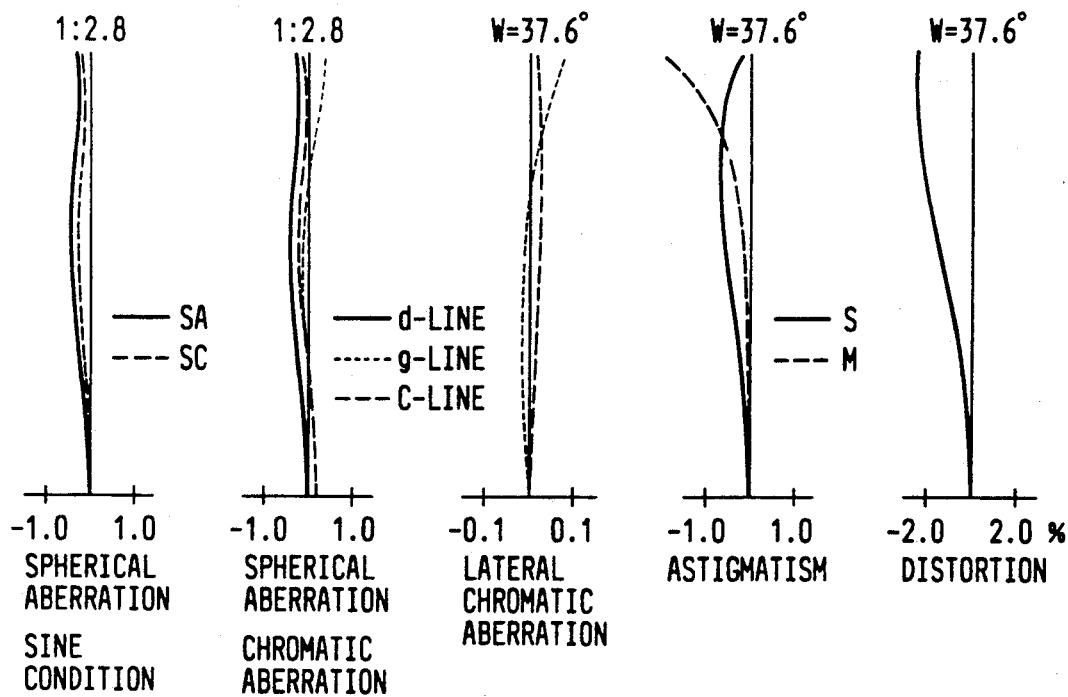
FIG. 8 shows the aberration curves for the lens system of FIG. 7.

FIG. 7 is a simplified cross-sectional view of a wide-angle lens system according to Example 4 of the present invention. Specific numerical data for this lens systems are given in Table 4, and the aberration curves for the system are shown in FIG. 8.

TABLE 4

| Surface No. | f = 100<br>FNo. = 1:2.8<br>r | fB = 127.2<br>ω = 37.6°<br>d | N | v |
|---|---|---|---|---|
| S1 | 2696.68 | 10.43 | 1.58913 | 61.2 |
| S2 | −1377.91 | 0.35 | | |
| S3 | 232.48 | 8.34 | 1.62041 | 60.3 |
| S4 | 56.59 | 80.65 | | |
| S5 | 93.70 | 38.23 | 1.77250 | 49.6 |
| S6 | −194.71 | 23.16 | | |
| *S7 | −77.77 | 0.35 | 1.54380 | 39.4 |
| S8 | −77.77 | 6.95 | 1.80518 | 25.4 |
| S9 | 162.23 | 3.67 | | |
| S10 | 1095.14 | 13.48 | 1.77250 | 49.6 |
| S11 | −61.07 | | | |

K = 4.035
A4 = 0.000
A6 = −1.735 × $10^{-10}$
A8 = 1.232 × $10^{-12}$
A10 + 0.000
[log(ΔX1/ΔX2)/log2] = 4.09
fF = −134.3

EXAMPLE 5

Figure 9:
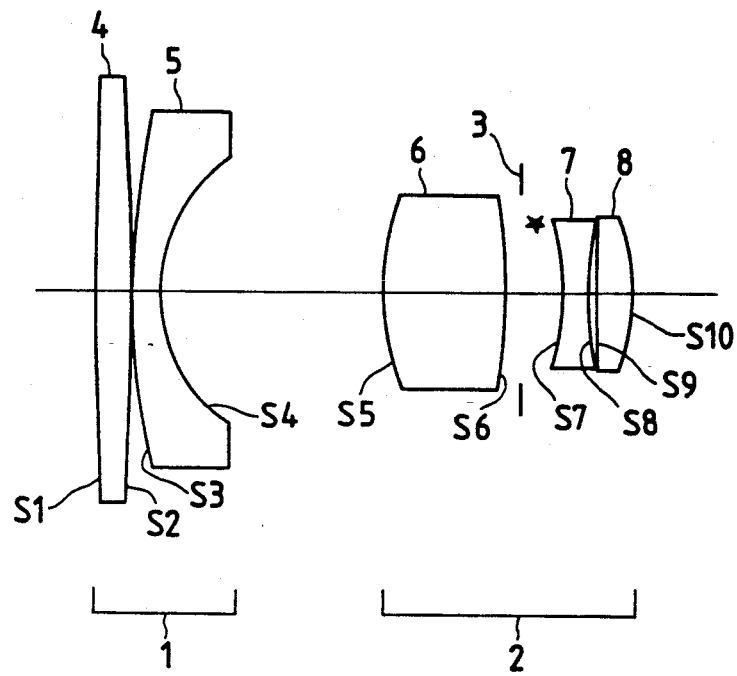
FIG. 9 is a simplified cross-sectional view of the wide-angle lens system of Example 5.
Figure 10:
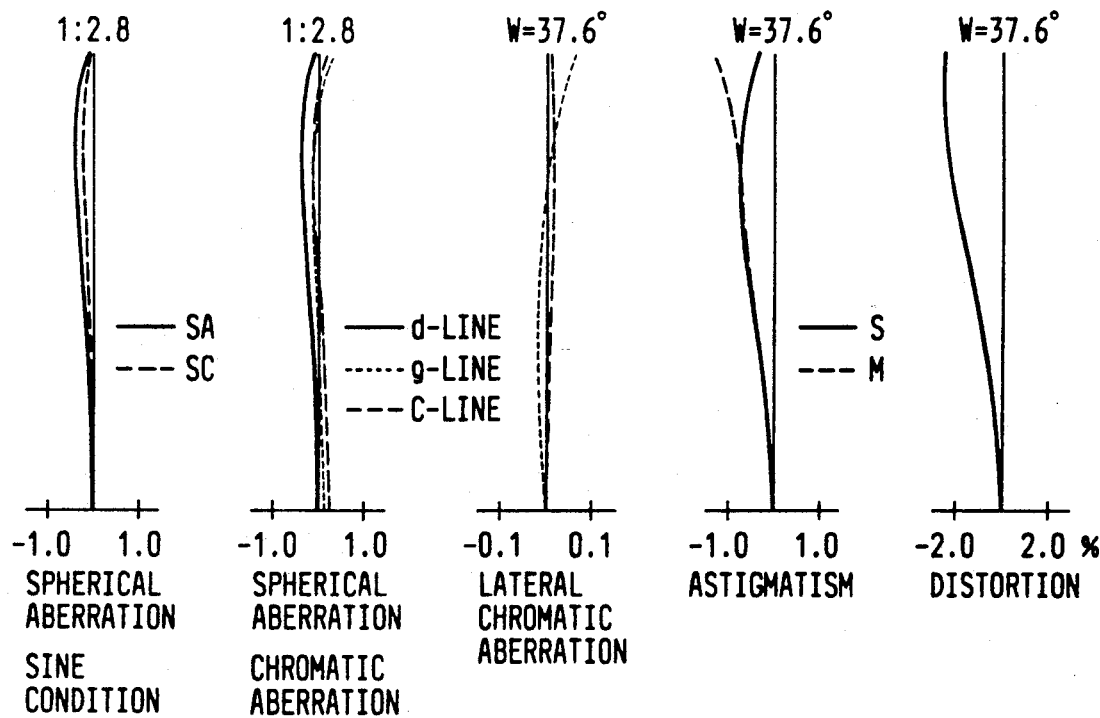
FIG. 10 shows the aberration curves for the lens system of FIG. 9.

FIG. 9 is a simplified cross-sectional view of a wide-angle lens system according to Example 5 of the present invention. Specific numerical data for this lens system are given in Table 5, and the aberration curves for the system are shown in FIG. 10.

TABLE 5

| Surface No. | f = 100<br>FNo. = 1:2.8<br>r | fB = 127.5<br>ω = 37.6°<br>d | N | v |
|---|---|---|---|---|
| S1 | 1280.32 | 10.43 | 1.58913 | 61.2 |
| S2 | −1292.08 | 0.35 | | |
| S3 | 251.03 | 8.34 | 1.62041 | 60.3 |
| S4 | 50.21 | 69.57 | | |
| S5 | 82.29 | 38.23 | 1.77250 | 49.6 |
| S6 | −179.98 | 17.55 | | |
| *S7 | −87.16 | 0.35 | 1.54380 | 39.4 |
| S8 | −87.16 | 6.95 | 1.78470 | 26.2 |
| S9 | 119.65 | 2.09 | | |
| S10 | 549.54 | 11.10 | 1.77250 | 49.6 |
| S11 | −65.54 | | | |

K = 1.073
A4 = −9.526 × $10^{-7}$
A6 = 8.552 × $10^{-11}$
A8 = 0.000
A10 = 0.000
[log(ΔX1/ΔX2)/log2] = 3.98
fF = −114.6

As described above, an appropriate aspheric surface is provided in a retrofocus-type wide-angle lens system having a simple five-element composition, and the resulting wide-angle lens system is compact and yet achieves high performance. without departing from the spirit and scope of the invention as defined in the appended claims.

What is claimed:

1. A wide-angle lens system comprising, in order from an object side to an image side:
    a front lens component having a negative power and including, in order from said object side to said image side, a positive first lens element and a negative meniscus second lens element having a convex surface directed toward said object side; and
    a rear lens component having a positive power, said rear lens component including a diaphragm stop, and further including, in order from said object side to said image side, a positive third lens element, a negative fourth lens element having an aspheric surface and a positive fifth lens element, wherein the negative power of said fourth lens element at each point along a radius of said fourth lens element is a function of a distance between said point and an optical axis, such that a negative power of said fourth element increases in a radially outward direction.

2. A wide-angle lens system as claimed in claim 1, wherein a distance between said aspheric surface and a spherical reference plane at any given point along the aspheric surface is a function of a distance between said point and the optical axis.

3. A wide-angle lens system as claimed in claim 2, wherein said aspheric surface is shaped such that a distance between the aspheric surface and the reference plane at an effective aperture of the fourth lens element maintains a predetermined relation to a distance between the aspheric surface and the reference plane at a point along the aspheric surface half way between the effective aperture and the optical axis.

4. A wide-angle lens system as claimed in claim 2, wherein said lens system satisfies the following conditions:

$$3.5 < [\log(\Delta X1/\Delta X2)/\log 2] < 4.5$$

$$1.0 < |fF/f| < 1.4, fF < 0$$

$$NRP > 1.65$$

where $\Delta X1$ is a distance between a point on the aspheric surface at an effective aperture of the fourth lens element and said spherical reference plane; $\Delta X2$ is a distance between a point on the aspheric surface at one half of the effective aperture and said spherical reference plane; fF is a focal length of the front component; f is a focal length of the overall lens system; and NRP is a refractive index at a d-line of a positive lens element in the rear component.

5. A wide-angle lens system according to claim 1, wherein said fourth lens element comprises a ground end polished glass substrate having a spherical surface, and a synthetic resin layer overlying said glass substrate and having an anaspheric surface.

6. A wide-angle lens system according to claim 1 which satisfies the following conditions:

$$\nu > 60$$

$$N1 > 1.55$$

where $\nu 1$ is an Abbe number of the first lens element; and N1 is a refractive index of the first lens element at a d-line thereof.

7. A wide-angle lens system as claimed in claim 2, wherein said lens system satisfies the following condition:

$$3.5 < [\log(\Delta X1/\Delta X2)/\log 2] < 4.5$$

where $\Delta X1$ is a distance between a point on the aspheric surface at an effective aperture of the fourth lens element and said spherical reference plane; and $\Delta X 2$ is a distance between a point on the aspheric surface at one half of the effective aperture and said spherical reference plane.

8. A wide-angle lens system as claimed in claim 2, wherein said lens system satisfies the following condition:

$$1.0 < |fF/f| < 1.4, fF < 0$$

where fF is a focal length of the front component; and f is a focal length of the overall lens system.

9. A wide-angle lens system as claimed in claim 2, wherein said lens system satisfies the following condition:

$$NRP > 1.65$$

where NRP is a refractive index at a d-line of a position lens element in the rear component.

10. A wide-angle lens system comprising, in order from an object side to an image side:
    a front lens component having a negative power and including, in order from said object side to said image side, a positive first lens element, and a negative meniscus second lens element having a convex surface directed toward the object side; and
    a rear lens component a positive power, said rear lens component including a diaphram stop and further including, in order from said side to said image side, a positive third lens element, a negative fourth lens element having an aspheric surface and a positive fifth lens element, wherein a distance between said aspheric surface of said fourth lens element and a spherical reference plane at any given point along the aspheric surface is a function of a distance between said point and the optical axis.

11. A wide-angle lens system as claimed in claim 10, wherein said aspheric surface is shaped such that a distance between the aspheric surface and the reference plane at an effective aperture of the fourth lens element maintains a predetermined relation to a distance between the aspheric surface and the reference plane at a point along the aspheric surface half way between the effective aperture and the optical axis.

12. A wide-angle lens system as claimed in claim 10, wherein the negative power at each point along a radius of said fourth lens element is a function of a distance between said point and the optical axis, such that negative power of said fourth element increases in a radially outward direction.

13. A wide-angle lens system as claimed in claim 10, wherein said lens system satisfies the following conditions:

$$3.5 < [\log(\Delta X1/\Delta X2)/\log 2] < 4.5$$

$$1.0 < |fF/f| < 1.4, fF < 0$$

$$NRP > 1.65$$

where $\Delta X1$ is a distance between a point on the aspheric surface at an effective aperture of the fourth lens element and said spherical reference plane; $\Delta X2$ is a distance between a point on the aspheric surface at one half of the effective aperture and said spherical reference plane; fF is a focal length of the front component; f is a focal length of the overall lens system; and NRP is a refractive index at a d-line of a positive lens element in the rear component.

14. A wide-angle lens system according to claim 10, wherein said fourth lens element comprises a ground end polished glass substrate having a spherical surface, and a synthetic resin layer overlying said glass substrate and having an aspheric surface.

15. A wide-angle lens system according to claim 10 which satisfies the following conditions:

$$\nu 1 > 60$$

$$N1 > 1.55$$

where $\nu 1$ is an Abbe number of the first lens element; and N1 is a refractive index of the first lens element at a d-line thereof.

16. A wide-angle lens system as claimed in claim 10, wherein said lens system satisfies the following conditions:

$$3.5 < [\log(\Delta X1/\Delta X2)/\log 2] < 4.5$$

where $\Delta X1$ is a distance between a point on the aspheric surface at an effective aperture of the fourth lens element and said spherical reference plane, and $\Delta X2$ is a distance between a point on the aspheric surface at one half of the effective aperture and said spherical reference plane.

17. A wide-angle lens system as claimed in claim 10, wherein said lens system satisfies the following condition:

$$1.0 < |fF/f| < 1.4, fF < 0$$

where fF is a focal length of the front component, and f is a focal length of the overall lens system.

18. A wide-angel lens system as claimed in claim 10, wherein said lens system satisfies the following condition:

$$NRP > 1.65$$

where NRP is a refractive index at a d-line of a positive lens element in the rear component.

* * * * *